(12) United States Patent
Aston et al.

(10) Patent No.: US 12,172,415 B2
(45) Date of Patent: Dec. 24, 2024

(54) SANDWICH PANELS AND METHODS OF MANUFACTURING SANDWICH PANELS

(71) Applicant: The Boeing Company, Arlington, VA (US)

(72) Inventors: Richard W. Aston, Steilacoom, WA (US); Nicole M. Jain, Hermosa Beach, CA (US); Mara N. Pearson, Los Angeles, CA (US); Matthew J. Herrmann, Rancho Palos Verdes, CA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/153,916

(22) Filed: Jan. 12, 2023

(65) Prior Publication Data

US 2024/0239079 A1 Jul. 18, 2024

(51) Int. Cl.
*B32B 3/12* (2006.01)
*B32B 3/26* (2006.01)
(Continued)

(52) U.S. Cl.
CPC ............... *B32B 3/12* (2013.01); *B32B 3/266* (2013.01); *B32B 7/12* (2013.01); *B32B 15/06* (2013.01); *B32B 15/082* (2013.01); *B32B 25/00* (2013.01); *B32B 27/308* (2013.01); *B32B 37/182* (2013.01); *B33Y 80/00* (2014.12); *B32B 2250/40* (2013.01); *B32B 2305/024* (2013.01); *B32B 2307/56* (2013.01); *B32B 2311/00* (2013.01); *B32B 2319/00* (2013.01);
(Continued)

(58) Field of Classification Search
CPC .................................. B32B 3/12; B32B 3/266
See application file for complete search history.

(56) References Cited

U.S. PATENT DOCUMENTS 7,382,959 B1   6/2008   Jacobsen
7,653,279 B1   1/2010   Jacobsen
(Continued)

FOREIGN PATENT DOCUMENTS

DE       3720371 A1    1/1989
DE  102010015638 A1   10/2011

OTHER PUBLICATIONS

Hunt, H.; "Damping of Acoustic Waves: High Damping Alloys and Inorganic Noise Absorbing Materials" from the "Encyclopedia of Materials: Science and Technology"; 2001, p. 1-6.*

(Continued)

*Primary Examiner* — Mark Ruthkosky
*Assistant Examiner* — Julia L Rummel
(74) *Attorney, Agent, or Firm* — Kolitch Romano Dascenzo Gates LLC (57) ABSTRACT

Sandwich panels (10) comprise a first microtruss panel (12), a second microtruss panel (18), and a damping film (26). The first microtruss panel (12) comprises a first outer skin (14) and a first microtruss structure (16) integral with the first outer skin (14). The second microtruss panel (18) comprises a second outer skin (20) and a second microtruss structure (22) integral with the second outer skin (20). The damping film (26) is positioned between and engaged with the first microtruss panel (12) and the second microtruss panel (18) opposite the first outer skin (14) and the second outer skin (20).

20 Claims, 4 Drawing Sheets

(51) Int. Cl.
  *B32B 7/12*      (2006.01)
  *B32B 15/06*     (2006.01)
  *B32B 15/082*    (2006.01)
  *B32B 25/00*     (2006.01)
  *B32B 27/30*     (2006.01)
  *B32B 37/18*     (2006.01)
  *B33Y 80/00*     (2015.01)

(52) U.S. Cl.
  CPC ....... *B32B 2333/08* (2013.01); *B32B 2419/00* (2013.01); *B32B 2605/00* (2013.01); *B32B 2607/00* (2013.01)

(56) References Cited

U.S. PATENT DOCUMENTS

| | | |
|---|---|---|
| 8,052,089 B2 | 11/2011 | Etling |
| 8,092,957 B2 | 1/2012 | Rock et al. |
| 8,197,930 B1 | 6/2012 | Jacobsen et al. |
| 8,534,418 B2 | 9/2013 | Pachale |
| 8,586,179 B1 | 11/2013 | Jacobsen et al. |
| 8,663,539 B1 | 3/2014 | Kolodziejska et al. |
| 8,800,641 B2 | 8/2014 | Jacobsen et al. |
| 9,017,806 B2 | 4/2015 | Jacobsen et al. |
| 9,315,213 B2 | 4/2016 | Raymond |
| 9,321,241 B2 | 4/2016 | Doty et al. |
| 9,352,529 B2 | 5/2016 | Clough et al. |
| 10,183,736 B2 | 1/2019 | Doty et al. |
| 2010/0108814 A1 | 5/2010 | Etling |
| 2010/0159303 A1* | 6/2010 | Rock ................... H01M 8/0245 429/507 |
| 2010/0291466 A1* | 11/2010 | Rock ................... H01M 8/0241 429/535 |
| 2010/0300669 A1 | 12/2010 | Jacobsen et al. |
| 2013/0303067 A1* | 11/2013 | Doty ......................... B32B 3/12 156/196 |
| 2014/0252674 A1* | 9/2014 | Hundley ................. B32B 9/005 428/116 |
| 2015/0017383 A1* | 1/2015 | Yang ......................... E04C 2/40 428/116 |
| 2017/0136738 A1 | 5/2017 | Koga et al. |
| 2021/0187897 A1* | 6/2021 | Reinhall ................. B32B 27/08 |

OTHER PUBLICATIONS

Davis et al., "Honeycomb Bond and Core Durability Issues; Experiences Within CREDP Nations," Aging Aircraft Conference, Williamsberg, VA, Aug. 31-Sep. 2, 1998.

Li et al., "Investigation of an Accelerated Moisture Removal Approach of a Composite Aircraft Control Surface," National Research Council Canada, University of Ottawa, Department of National Defense Canada, 2006.

English machine-translation of DE3720371A1 downloaded from Google Patents Jan. 12, 2023.

English machine-translation of DE102010015638A1 downloaded from Google Patents Jan. 12, 2023.

European Patent Office, Extended European Search Report in related European patent application No. EP 23 21 4369 (May 21, 2024).

* cited by examiner

SANDWICH PANELS AND METHODS OF MANUFACTURING SANDWICH PANELS

FIELD

The present disclosure relates to sandwich panels and methods of manufacturing sandwich panels.

BACKGROUND

Due to their high structural rigidity and low mass, sandwich panels are used to construct a variety of components in various industries, such as in the manufacture of aircraft, spacecraft, marine vehicles, land vehicles, and other apparatuses. Various equipment may be mounted to sandwich panels, and in some applications, the equipment may impart undesirable vibrations through the sandwich panels.

SUMMARY

Sandwich panels according to the present disclosure comprise a first microtruss panel, a second microtruss panel, and a damping film. The first microtruss panel comprises a first outer skin and a first microtruss structure integral with the first outer skin. The second microtruss panel comprises a second outer skin and a second microtruss structure integral with the second outer skin, wherein the second microtruss structure comprises second truss elements. The damping film is positioned between and engaged with the first microtruss panel and the second microtruss panel opposite the first outer skin and the second outer skin.

Methods for manufacturing sandwich panels according to the present disclosure comprise additively manufacturing a first microtruss panel, additively manufacturing a second microtruss panel, and coupling a damping film between the first microtruss panel and the second microtruss panel.

DESCRIPTION

Figure 1:
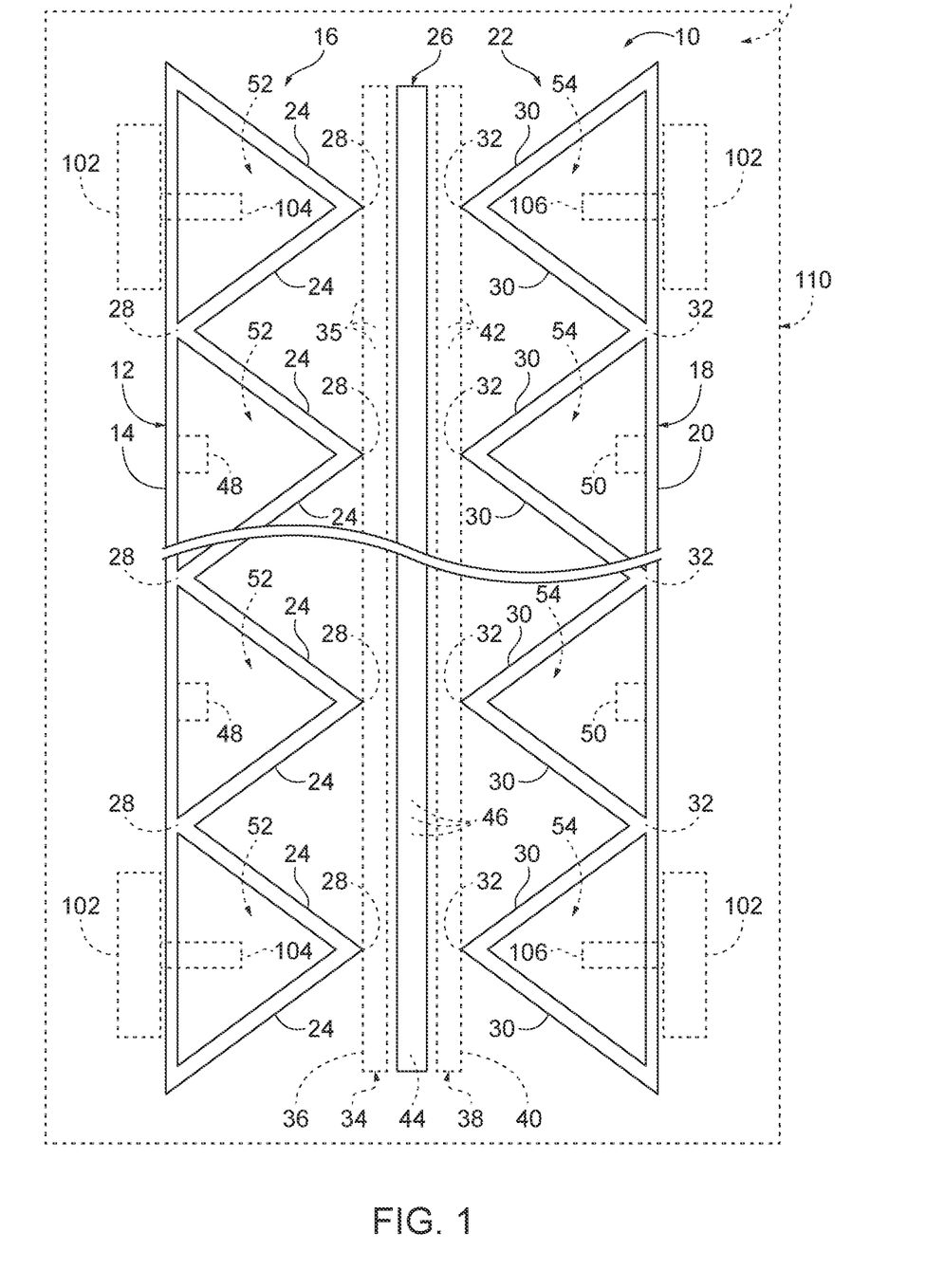
FIG. 1 is a schematic diagram representing sandwich panels according to the present disclosure.

FIG. 1 schematically illustrates sandwich panels 10, sandwich-panel assemblies 100, and apparatuses 110 according to the present disclosure. Generally, in FIG. 1, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

As schematically illustrated in FIG. 1, a sandwich panel 10 may be a component of a sandwich-panel assembly 100 and/or an apparatus 110. For example, a sandwich-panel assembly 100 may comprise a sandwich panel 10 and equipment 102 that is operatively coupled to the sandwich panel 10. Examples of apparatuses 110, which may include one or more sandwich panels 10 and/or one or more sandwich-panel assemblies 100, include, but are not limited to, vehicles such as spacecraft, aircraft, marine vehicles, and land vehicles, as well as equipment, machinery, buildings, etc. Sandwich panels 10 may be structural panels of an apparatus 110 and/or may be used as an equipment panel within an apparatus 110, that is, for securing equipment 102 thereto. Illustrative non-exclusive examples of equipment 102 include pumps, compressors, fans, motors, fly wheel assemblies, reciprocators, and other equipment that may create and/or transmit vibrations to a sandwich panel 10 to which it is coupled; however, sandwich panels 10 are not limited to being used with vibration-inducing equipment.

As schematically illustrated in FIG. 1, sandwich panels 10 comprise at least a first microtruss panel 12, a second microtruss panel 18, and a damping film 26 that is positioned between and engaged with the first microtruss panel 12 and the second microtruss panel 18. In some examples, the first microtruss panel 12 forms a first percentage of the core of the sandwich panel 10 and the second microtruss panel 18 forms a second percentage of the core of the sandwich panel 10. In some such examples, the damping film 26 may form the remaining percentage of the sandwich panel 10. The damping film 26 is provided to attenuate vibrations emanating from equipment 102 coupled to the sandwich panel 10. The representation of the first microtruss panel 12 and the second microtruss panel 18 in FIG. 1 are schematic in nature and do not limit the microtruss panels to the schematically illustrated configuration. For example, while the first microtruss panel 12, the second microtruss panel 18, and the sandwich panel 10 itself are schematically represented in a generally flat or planar configuration in FIG. 1, sandwich panels and their component parts may take any various configurations, including curved and complex configurations.

The first microtruss panel 12 may be substantially identical to the second microtruss panel 18. As used herein, "substantially identical" includes at least 75% of the recited similarity or relationship. For example, a first microtruss panel 12 that is substantially identical to a second microtruss panel 18 includes a first microtruss panel 12 that is 75-100% identical to a second microtruss panel 18.

As schematically represented in FIG. 1, the first microtruss panel 12 comprises a first outer skin 14 and a first microtruss structure 16 that is integral with the first outer skin 14, and the first microtruss structure 16 comprises first truss elements 24. Similarly, the second microtruss panel 18 comprises a second outer skin 20 and a second microtruss structure 22 that is integral with the second outer skin 20, and the second microtruss structure 22 comprises second truss elements 30. In some examples, the first outer skin 14 and the first microtruss structure 16 of the first microtruss panel 12 are substantially identical with the second outer skin 20 and the second microtruss structure 22 of the second microtruss panel 18.

The outer skins of microtruss panels are expansive thin layers of material, from which at least a subset of the truss elements of the microtruss structures extend. The outer skins additionally or alternatively may be described as sheets or facesheets. The outer skins 14, 20 of sandwich panels 10 provide surfaces to which equipment 102 may be mounted and carry in-plane and bending loads applied to sandwich panels 10, whereas the microtruss structures 16, 22 (i.e., the core) of sandwich panels 10 react out-of-plane shear loads.

In some examples, the outer skins 14, 20 have constant thicknesses across their entireties. Alternatively, the outer skins 14, 20 may have varying thicknesses and/or areas of different thicknesses. For example, one or both of outer skins 14 and 20 may have a greater thickness in locations for mounting equipment 102.

As schematically illustrated in dashed lines in FIG. 1, the first outer skin 14 may comprise a plurality of first-outer-skin ridges 48. Similarly, the second outer skin 20 may comprise a plurality of second-outer-skin ridges 50. Such ridges additionally or alternatively may be described as ribs or reinforcing ribs. When present, the ridges 48, 50 may have any suitable structure for providing structural reinforcement to the outer skins 14, 20 and thus to the sandwich panel 10. For example, ridges 48, 50 may provide reinforcement to prevent buckling and/or dimpling of the outer skins 14, 20. In some examples, a plurality of first-outer-skin ridges 48 provides stability for the first outer skin 14 during manufacturing and use. Each ridge of the plurality of first-outer-skin ridges 48 may be integrally connected to the first outer skin 14 and/or to two or more truss elements of the plurality of truss elements 24. In some examples, each ridge of the plurality of first-outer-skin ridges 48 extends between two truss elements 24, 30, such that each ridge intersects another at the midpoint of both ridges. In some such examples, the location of an intersection of two ridges corresponds to a node of plurality of nodes 28.

Microtruss structures, which also may be referred to as microlattice structures, are structures with dimensions close to or within a range of millimeters to micrometers and having a periodic open cell structure with interconnected truss elements, which also may be referred to as struts. Microtruss structures additionally or alternatively may be described as space structures or 3D truss structures and as having a repeating pattern of a plurality of truss elements intersecting at a plurality of nodes.

Microtruss structures 16, 22 may be constructed utilizing various techniques, including (but not limited to) various additive manufacturing techniques, investment casting, deformation forming, textile weaving, selective laser melting, electron beam melting, and self-propagating waveguide techniques. Examples of suitable additive manufacturing techniques include (but are not limited to) powder bed fusion and directed energy deposition. Moreover, microtruss structures 16, 22 may be constructed of various materials, including metals and polymers, depending on the ultimate application of a given sandwich panel 10.

As schematically illustrated in FIG. 1, in some examples, the first microtruss structure 16 comprises, or defines, first nodes 28 at intersections of two or more first truss elements 24, and the second microtruss structure 22 comprises second nodes 32 at intersections of two or more second truss elements 30. Accordingly, the microtruss structures of sandwich panels 10 may be described as an open-cell configuration. In some examples, truss elements are circular in a cross-section. The cross-section of individual truss elements 24 and/or 30 may vary in diameter and/or thickness along the length of a truss element 24 and/or 30. For example, first truss elements 24 may be larger in diameter nearer to first outer skin 14 and thinner nearer to the first medial skin 34, or vice versa. The density, diameter, and/or length of truss elements 24 and/or 30 may vary depending on the application. For example, the density, diameter, and/or length of truss elements 24 and/or 30 may vary depending on expected stresses on and/or in the sandwich panel 10. In some such examples, the density, diameter, and/or length of truss elements 24, 30 may determine a thickness of their respective microtruss structures 16,18. Moreover, the thickness of the first microtruss structure 16 may be different from the thickness of the second microtruss structure 22.

While FIG. 1 schematically illustrates each of microtruss structures 16 and 18 as having only a single layer of cells, any suitable number of layers may be incorporated into the microtruss structures 16, 22 of sandwich panels 10. In some examples, a thickness of each microtruss structures 16, 18 is determined by the number of cells. Moreover, the first microtruss structure 16 and the second microtruss structure 22 need not have the same number of layers of cells or otherwise be identically constructed, depending on the ultimate application for a sandwich panel 10. For example, the first microtruss structure 16 may have a thickness greater than the second microtruss structure 22. In some examples, the density of cells for microtruss structures 16 and/or 18 varies. For example, the density of cells may vary depending on the density of the truss elements.

In some examples, the first truss elements 24 and the first outer skin 14 define a plurality of first-microtruss-panel square pyramids 52. Similarly, in some examples, the second truss elements 30 and the second outer skin 20 define a plurality of second-microtruss-panel square pyramids 54. That is, the open cells of the microtruss structures may be square pyramids, although other shapes also may be utilized and incorporated into the microtruss structures of sandwich panels 10. For example, the first truss elements 24 and the first outer skin 14 may define a plurality of first-microtruss-panel triangular pyramids, rectangular prisms, or prism shapes, etc. Similarly, the second truss elements 30 and the second outer skin 20 may define a plurality of second-microtruss-panel triangular pyramids, rectangular prisms, or other prism shapes, etc. In some examples, the triangular faces of the plurality of first-microtruss-panel square pyramids 52 are configured to be equilateral triangles. Similarly, in some examples, the triangular faces of the plurality of second-microtruss-panel square pyramids 54 are configured to be equilateral triangles.

As optionally represented in dashed lines in FIG. 1, in some examples, the first microtruss panel 12 further comprises a first medial skin 34 that is integral with the first microtruss structure 16 opposite the first outer skin 14. That is, the first microtruss structure 16 may be sandwiched between the first outer skin 14 and the first medial skin 34. In some such examples, at least a subset of the first truss elements 24 terminate at the first medial skin 34, such as with at least a subset of the first nodes 28 coinciding with the first medial skin 34. However, in other examples the first medial skin 34 may not coincide with first nodes 28, and instead, at least a subset of the first truss elements 24 may terminate at the first medial skin 34 without a corresponding first node 28.

The first medial skin 34, when present, provides structure for operative coupling of the first microtruss panel 12 to the damping film 26 beyond just the first nodes 28 or terminal ends of the first truss elements 24. Although not represented in FIG. 1, in some examples, the first medial skin 34 defines a first-medial-skin lattice structure 36 having a plurality of first-medial-skin voids 35. In some such examples, the first-medial-skin lattice structure 36 has a cross-shape, with the intersections of each cross located and integrally connected to a node of the plurality of first nodes 28. By having a lattice structure, the mass of the first medial skin 34 is reduced, and the sizes of the first-medial-skin voids 35 may be selected such that the resulting surface area of the first medial skin 34 is sufficient for operative coupling to the damping film 26. Alternatively, the first medial skin 34 may have a continuous surface, and such a continuous surface may be substantially identical to the first outer skin 14.

Similarly, as optionally represented in dashed lines in FIG. 1, in some examples, the second microtruss panel 18 further comprises a second medial skin 38 that is integral with the second microtruss structure 22 opposite the second outer skin 20. That is, the second microtruss structure 22 may be sandwiched between the second outer skin 20 and the second medial skin 38. In some such examples, at least a subset of the second truss elements 30 terminate at the second medial skin 38, such as with at least a subset of the second nodes 32 coinciding with the second medial skin 38. However, in other examples the second medial skin 38 may not coincide with the second nodes 32, and instead, at least a subset of the second truss elements 30 may terminate at the second medial skin 38 without a corresponding second node 32.

As with the first medial skin 34, the second medial skin 38, when present, provides structure for operative coupling of the second microtruss panel 18 to the damping film 26 beyond just the second nodes 32 or terminal ends of the second truss elements 30. Although not represented in FIG. 1, in some examples, like the first medial skin 34, the second medial skin 38 defines a second-medial-skin lattice structure 40 having a plurality of second-medial-skin voids 42. In some such examples, the lattice structure has a cross-shape, with the intersections of each cross located and integrally connected to a node of the plurality of second nodes 32. By having a lattice structure, the mass of the second medial skin 38 is reduced, and the sizes of the second-medial-skin voids 42 may be selected such that the resulting surface area of the second medial skin 38 is sufficient for operative coupling to the damping film 26. Alternatively, the second medial skin 38 may have a continuous surface, and such a continuous surface may be substantially identical to the second outer skin 20.

The damping film 26 of the sandwich panel 10 comprises any suitable films, sheets, skins, etc. configured to attenuate vibrations in the sandwich panel 10. In particular, the damping film 26 may be made of any material suitable for attenuating vibrations, such as (but not limited to) acrylic tape and/or synthetic rubber. In some examples, the material, thickness, and/or durometer of the damping film 26 are selected based on the type of loading to be used on the sandwich panel 10 (e.g., the types of equipment expected to be used) and/or vibrational modes. For example, the material, thickness, and/or durometer of the damping film 26 may be selected based on vibrations such as broad range random vibrations (20-2000 Hz), sine vibrations (10-100 Hz), vibrations from the acoustic environment, vibrational frequencies generated from resonance equipment, and/or specific frequencies due to mounted equipment 102.

In some examples, the damping film 26 is configured to attenuate vibrations present in the sandwich panel 10. In some such examples, the damping film 26 is configured to attenuate vibrations through friction. For example, the damping film 26 may be configured to attenuate vibrations through internal friction and converting vibrational energy into heat. Alternatively, the damping film 26 may be configured to attenuate vibrations through resisting and/or preventing movement in the first microtruss panel 12 and/or the second microtruss panel 18. In some such examples, damping film 26 may be configured to absorb and dissipate the shear strain energy by, for example, converting the energy into heat. In some examples, the damping film 26 is configured to achieve a damping level that is determined by the mounted equipment 102. Possible damping levels include underdamping, overdamping, and/or critical damping. In some examples, the damping film 26 is configured to prevent vibrations from transferring to the surrounding environment from the sandwich panel 10, as well as to reduce vibrational interference on the mounted equipment 102. The damping film 26 may be positioned to dampen different vibrational modes. For example, the damping film 26 may be positioned on the neutral axis of the sandwich panel 10, such that certain vibrational modes are damped. For example, the damping film 26 may be equidistant from the first outer skin 14 and the second outer skin 20. In other examples, the neutral axis of the sandwich panel 10 may not be equidistant from the first outer skin 14 and the second outer skin 20. In some examples, damping film 26 is positioned to absorb shear strain energy in sandwich panel 10. For example, in a symmetric sandwich panel, the maximum transverse shear occurs at the centerline or the center plane (i.e., equidistant between the first outer skin 14 the second outer skin 20, and damping film 26 may be positioned at the centerline or the center plane so to absorb the shear strain energy.

In some examples, the damping film 26 defines a damping-film lattice structure 44 having a plurality of damping-film voids 46, as schematically indicated in FIG. 1. By having such a lattice structure, the mass of the damping film 26 is reduced, and the sizes of the damping-film voids 46 may be selected to result in a desired level of damping by the damping film 26. Additionally, when a sandwich panel 10 comprises optional medial skins 34, 38, the damping-film lattice structure 44 may correspond with a first-medial-skin lattice structure 36 and a second-medial-skin lattice structure 40.

In some examples, the damping film 26 is adhered to the first microtruss panel 12 and to the second microtruss panel 18. In some examples, being adhered to the microtruss panels 12, 18 determines the position of the damping film 26 within the sandwich panel 10. For example, differences in the thicknesses between the microtruss structures 16, 22 may position the damping film 26 such that the damping film 26 is not equidistant from the first outer skin 14 and the second outer skin 20 when adhered to the microtruss panels 12, 18. In other examples, being adhered to the microtruss panels 12, 18 positions the damping film 26 at the centerline of the sandwich panel 10.

With continued reference to FIG. 1, in some examples, the first microtruss panel 12 comprises one or more first-microtruss-panel mounts 104 for operative coupling of equipment 102 to the sandwich panel 10. Similarly and as also schematically and optionally represented in FIG. 1, in some examples, the second microtruss panel 18 comprises one or more second-microtruss-panel mounts 106 for operative coupling of equipment 102 to the sandwich panel 10. In some examples, such mounts 104, 106 may be integral with the respective outer skins 14, 20, such as additively manufactured therewith. In other examples, such mounts 104, 106 may be operatively coupled to the respective outer skins 14, 20. The mounts 104, 106 may take any suitable form depending on the nature of the equipment 102 to be coupled to a sandwich panel, including (but not limited to), inserts, through-bushings, embedded fittings, threaded mounts, etc.

Figure 2:
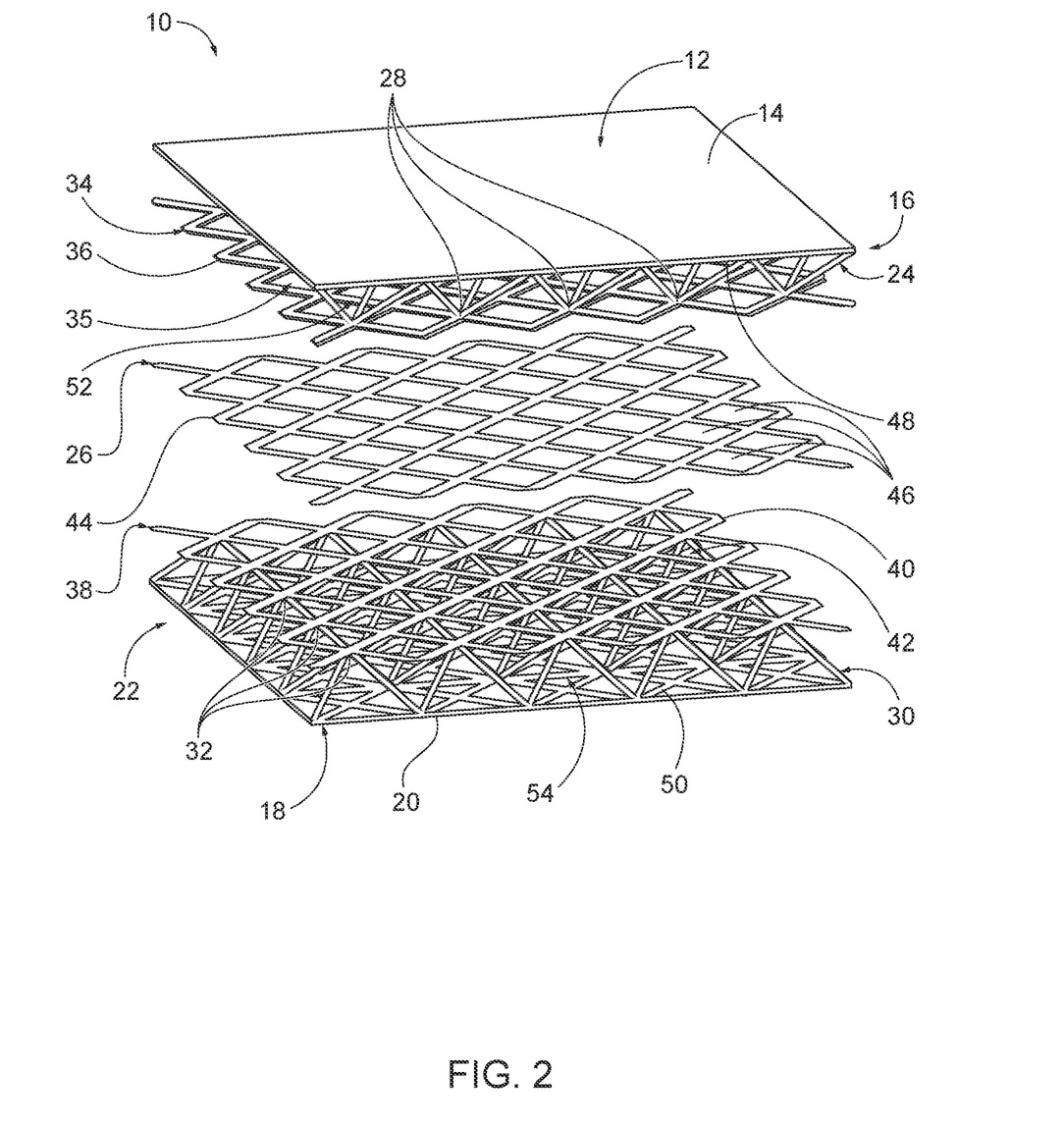
FIG. 2 is an exploded isometric view of an example sandwich panel.
Figure 3:
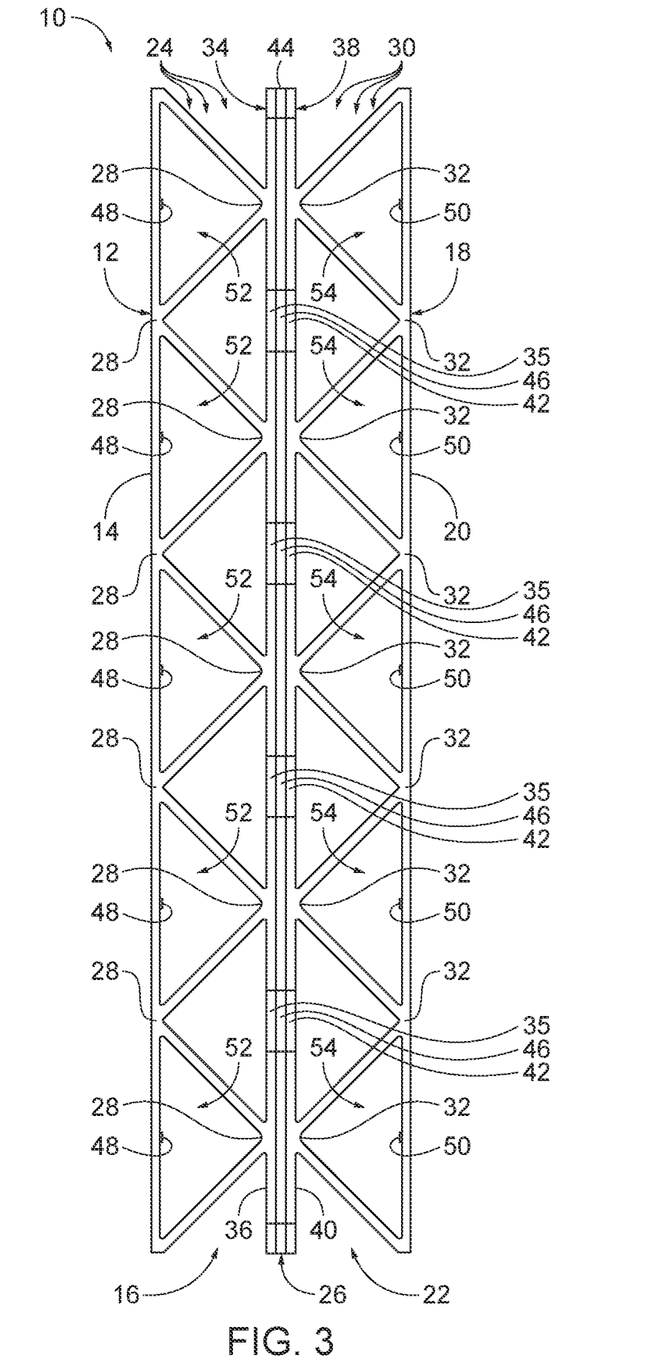
FIG. 3 is a cross-sectional view of the example sandwich panel of FIG. 2.

Turning now to FIGS. 2-3, an illustrative, non-exclusive example of a sandwich panel 10. Where appropriate, the reference numerals from the schematic illustration of FIG. 1 are used to designate corresponding parts of the example sandwich panel 10; however, the example of FIGS. 2-3 are non-exclusive and do not limit sandwich panels 10 to the illustrated embodiment of FIGS. 2-3. That is, sandwich panels 10 are not limited to the specific embodiment of FIGS. 2-3, and sandwich panels 10 may incorporate any number of the various aspects, configurations, characteristics, properties, etc. of sandwich panels 10 that are illustrated in and discussed with reference to the schematic representations of FIG. 1 and/or the embodiment of FIGS. 2-3, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the example of FIGS. 2-3; however, it is within the scope of the present disclosure that the previously discussed features, variants, etc. may be utilized with the example of FIGS. 2-3.

As illustrated in FIGS. 2-3, example sandwich panel 10 is an example of a sandwich panel 10 whose microtruss structures 16, 22 comprise nodes 28, 32, whose truss elements 24, 30 define square pyramids 52, 54, whose microtruss panels 12, 18 comprise medial skins 34, 38 having medial-skin voids 35, 42, and whose damping film 26 also similarly includes damping-film voids 46 that coincide with the medial-skin voids 35, 42.

Figure 4:
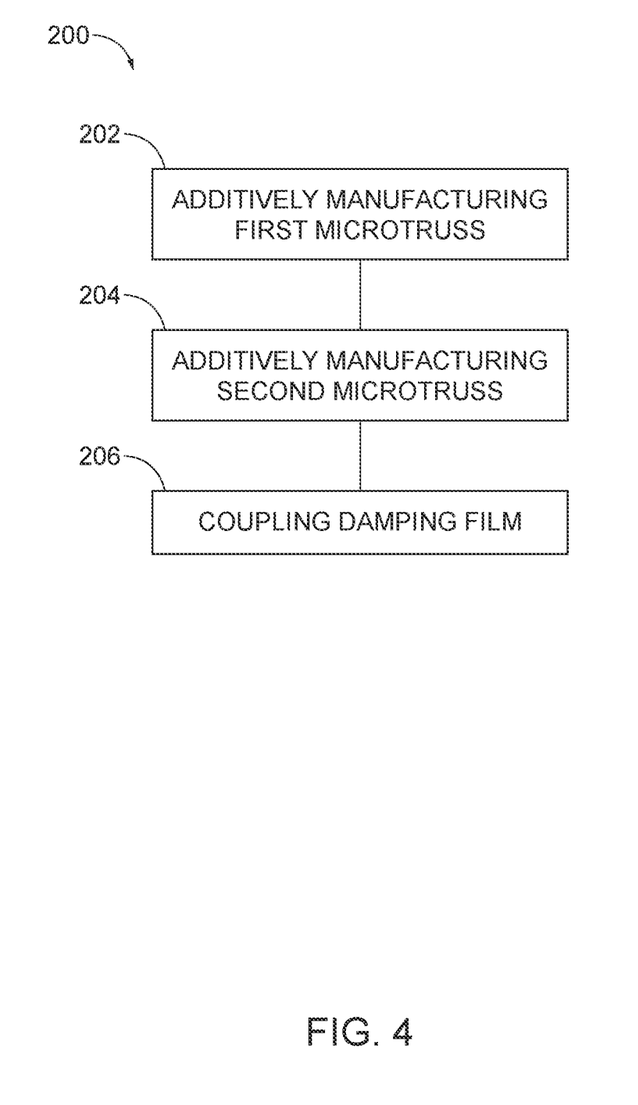
FIG. 4 is a flowchart schematically representing methods for manufacturing sandwich panels.

FIG. 4 schematically provides a flowchart that represents illustrative, non-exclusive examples of a method 200 for additively manufacturing sandwich panels 10 and/or sandwich-panel assemblies 100 according to the present disclosure. Not all methods according to the present disclosure are required to include the steps illustrated. The methods and steps illustrated in FIG. 4 are not limiting and other methods and steps are within the scope of the present disclosure, including methods having greater than or fewer than the number of steps illustrated, as understood from the discussions herein.

As seen in FIG. 4, method 200 comprises additively manufacturing 202 the first microtruss panel 12, additively manufacturing 204 the second microtruss panel 18, and coupling 206 the damping film 26 between the first microtruss panel 12 and the second microtruss panel 18.

Any additive manufacturing techniques may be used to form the first microtruss panel 12 and the second microtruss panel 18, such as discussed herein.

In some examples, the first truss elements 24 of the first microtruss structure 16 are configured such that support structures are not required during the additively manufacturing 202 of the first microtruss panel 12. Herein, support structures refer to structures that support and/or stabilize other portions of an object being additively manufactured. For example, in examples of methods 200 in which the sandwich panel 10 includes a first medial skin 34, the first medial skin 34 may be entirely supported by the first truss elements 24 during the additively manufacturing 202 of the first microtruss panel 12. Additionally or alternatively, a perimeter of the first medial skin 34 does not extend past a perimeter of the first outer skin 14 such that the first microtruss structure 16 acts as a support structure for first medial skin 34 during the additively manufacturing 202. Having the first microtruss panel 12 fully self-supported during the additively manufacturing 202 eliminates the need for removing support structures post-manufacturing. Similarly, in some examples, the second truss elements 30 of the second microtruss structure 22 are configured such that support structures are not required during the additively manufacturing 204 of the second microtruss panel 18. For example, in examples of methods 200 in which the sandwich panel 10 includes a second medial skin 38, the second medial skin 38 may be entirely supported by the second truss elements 30 during the additively manufacturing 204 of the second microtruss panel 18, thereby eliminating the need for removing support structures post-manufacturing. Additionally or alternatively, a perimeter of the second medial skin 38 does not extend past a perimeter of the second outer skin 20 such that second microtruss structure 22 acts as a support structure for the second medial skin 38 during the additively manufacturing 204.

The coupling 206 may comprise adhering the damping film 26 to the first microtruss panel 12 and to the second microtruss panel 18 with an adhesive. Alternatively, the damping film 26 may be held in place between and engaged with the first microtruss panel 12 and the second microtruss panel 18 by clamping or otherwise fastening the first microtruss panel 12 to the second microtruss panel 18.

Illustrative, non-exclusive examples of inventive subject matter according to the present disclosure are described in the following enumerated paragraphs:

A. A sandwich panel (10), comprising:
   a first microtruss panel (12) comprising a first outer skin (14) and a first microtruss structure (16) integral with the first outer skin (14), wherein the first microtruss structure (16) comprises first truss elements (24);
   a second microtruss panel (18) comprising a second outer skin (20) and a second microtruss structure (22) integral with the second outer skin (20), wherein the second microtruss structure (22) comprises second truss elements (30); and
   a damping film (26) positioned between and engaged with the first microtruss panel (12) and the second microtruss panel (18) opposite the first outer skin (14) and the second outer skin (20).

A1. The sandwich panel (10) of paragraph A,
   wherein the first microtruss structure (16) further comprises first nodes (28) at intersections of two or more first truss elements (24); and
   wherein the second microtruss structure (22) comprises second nodes (32) at intersections of two or more second truss elements (30).

A1.1. The sandwich panel (10) of paragraph A1, wherein the first truss elements (24) and the first outer skin (14) define a plurality of first-microtruss-panel square pyramids (52).

A1.2. The sandwich panel (10) of any of paragraphs A1-A1.1, wherein the second truss elements (30) and the second outer skin (20) define a plurality of second-microtruss-panel square pyramids (54).

A2. The sandwich panel (10) of any of paragraphs A-A1.2, wherein the first microtruss panel (12) further comprises a first medial skin (34) integral with the first microtruss structure (16) opposite the first outer skin (14).

A2.1. The sandwich panel (10) of paragraph A2, wherein at least a subset of the first truss elements (24) terminate at the first medial skin (34).

A2.2. The sandwich panel (10) of any of paragraphs A2-A2.1 when depending from paragraph A1, wherein at least a subset of the first nodes (28) coincide with the first medial skin (34).

A2.3. The sandwich panel (10) of any of paragraphs A2-A2.2, wherein the first medial skin (34) defines a first-medial-skin lattice structure (36) having a plurality of first-medial-skin voids (35).

A3. The sandwich panel (10) of any of paragraphs A-A2.3, wherein the second microtruss panel (18) further comprises a second medial skin (38) integral with the second microtruss structure (22) opposite the second outer skin (20).

A3.1. The sandwich panel (10) of paragraph A3, wherein at least a subset of the second truss elements (30) terminate at the second medial skin (38).

A3.2. The sandwich panel (10) of any of paragraphs A3-A3.1 when depending from paragraph A1, wherein at least a subset of the second nodes (32) coincide with the second medial skin (38).

A3.3. The sandwich panel (10) of any of paragraphs A3-A3.2, wherein the second medial skin (38) defines a second-medial-skin lattice structure (40) having a plurality of second-medial-skin voids (42).

A4. The sandwich panel (10) of any of paragraphs A-A3.3, wherein the damping film (26) defines a damping-film lattice structure (44) having a plurality of damping-film voids (46).

A4.1. The sandwich panel (10) of paragraph A4 when depending from paragraph A2.3, wherein the damping-film lattice structure (44) coincides with the first-medial-skin lattice structure (36).

A4.2. The sandwich panel (10) of any of paragraphs A4-A4.1 when depending from paragraph A3.3, wherein the damping-film lattice structure (44) coincides with the second-medial-skin lattice structure (40).

A5. The sandwich panel (10) of any of paragraphs A-A4.2, wherein the damping film (26) is equidistant from the first outer skin (14) and the second outer skin (20).

A6. The sandwich panel (10) of any of paragraphs A-A5, wherein the first outer skin (14) and the first microtruss structure (16) of the first microtruss panel (12) are substantially identical with the second outer skin (20) and the second microtruss structure (22) of the second microtruss panel (18).

A7. The sandwich panel (10) of any of paragraphs A-A6, wherein the damping film (26) is adhered to the first microtruss panel (12) and to the second microtruss panel (18).

A8. The sandwich panel (10) of any of paragraphs A-A7, wherein the damping film (26) is constructed of acrylic tape or synthetic rubber materials.

A9. The sandwich panel (10) of any of paragraphs A-A8, wherein the first outer skin (14) comprises a plurality of first-outer-skin ridges (48) extending toward the second microtruss panel (18).

A9.1. The sandwich panel (10) of paragraph A9, wherein a subset of the plurality of first-outer-skin ridges (48) extends linearly between intersections of the first truss elements (24) and the first outer skin (14).

A10. The sandwich panel (10) of any of paragraphs A-A9.1, wherein the second outer skin (20) comprises a plurality of second-outer-skin ridges (50) extending toward the first microtruss panel (12).

A10.1. The sandwich panel (10) of paragraph A10, wherein a subset of the plurality of second-outer-skin ridges (50) extends linearly between intersections of the second truss elements (30) and the second outer skin (20).

A11. The sandwich panel (10) of any of paragraphs A-A10.1, wherein the first microtruss panel (12) and the second microtruss panel (18) are constructed of metal.

A11.1. The sandwich panel (10) of paragraph A11, wherein the first microtruss panel (12) and the second microtruss panel (18) are constructed of aluminum or an aluminum alloy.

A12. The sandwich panel (10) of any of paragraphs A-A11.1, wherein the first microtruss panel (12) comprises one or more first-microtruss-panel mounts (104) for operative coupling of equipment (102) to the sandwich panel (10).

A12.1. The sandwich panel (10) of paragraph A12, wherein the one or more first-microtruss-panel mounts (104) are integral with the first outer skin (14).

A12.2. The sandwich panel (10) of paragraph A12, wherein the one or more first-microtruss-panel mounts (104) are operatively coupled to the first outer skin (14).

A13. The sandwich panel (10) of any of paragraphs A-A12.2, wherein the second microtruss panel (18) comprises one or more second-microtruss-panel mounts (106) for operative coupling of the equipment (102) to the sandwich panel (10).

A13.1. The sandwich panel (10) of paragraph A13, wherein the one or more second-microtruss-panel mounts (106) are integral with the second outer skin (20).

A13.2. The sandwich panel (10) of paragraph A13, wherein the one or more second-microtruss-panel mounts (106) are operatively coupled to the second outer skin (20).

B. A sandwich-panel assembly (100), comprising:
the sandwich panel (10) of any of paragraphs A-A11.1; and
equipment (102) operatively coupled to the sandwich panel (10).

B1. The sandwich-panel assembly (100) of paragraph B, wherein the first microtruss panel (12) comprises one or more first-microtruss-panel mounts (104), and wherein the equipment (102) is operatively mounted to the one or more first-microtruss-panel mounts (104).

B1.1. The sandwich-panel assembly (100) of paragraph B1, wherein the one or more first-microtruss-panel mounts (104) are integral with the first outer skin (14).

B1.2. The sandwich-panel assembly (100) of paragraph B1, wherein the one or more first-microtruss-panel mounts (104) are operatively coupled to the first outer skin (14).

B2. The sandwich-panel assembly (100) of any of paragraphs B-B1.2., wherein the second microtruss panel (18) comprises one or more second-microtruss-panel mounts (106), and wherein the equipment (102) is operatively mounted to the one or more second-microtruss-panel mounts (106).

B2.1. The sandwich-panel assembly (100) of paragraph B2, wherein the one or more second-microtruss-panel mounts (106) are integral with the second outer skin (20).

B2.2. The sandwich-panel assembly (100) of paragraph B2, wherein the one or more second-microtruss-panel mounts (106) are operatively coupled to the second outer skin (20).

B3. The sandwich-panel assembly (100) of any of paragraphs B-B2.2, wherein the equipment (102) is configured to impart a vibration to the sandwich panel (10).

B3.1. The sandwich-panel assembly (100) of paragraph B3., wherein the damping film (26) is configured to attenuate vibrations imparted to the sandwich-panel assembly (100) by the equipment (102).

C. An apparatus (110), comprising the sandwich-panel assembly (100) of any of paragraphs B-B3.1.

D. A method (200) of manufacturing the sandwich panel (10) of any of paragraphs A-A13.2 or the sandwich-panel assembly (100) of any of paragraphs B-B3.1, comprising:

additively manufacturing (202) the first microtruss panel (12);

additively manufacturing (204) the second microtruss panel (18); and coupling (206) the damping film (26) between the first microtruss panel (12) and the second microtruss panel (18).

E. Use of the sandwich panel (10) of any of paragraphs A-A13.2 to attenuate vibrations from equipment (102) operatively coupled to the sandwich panel (10).

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A sandwich panel, comprising:

a metal first microtruss panel comprising a first outer skin, a first medial skin opposite the first outer skin, and a first microtruss structure integral with the first outer skin and with the first medial skin, wherein the first microtruss structure is a three-dimensional, periodic open-cellular structure comprising first truss elements that intersect at first truss nodes, and wherein the first medial skin is a grid-shaped first-medial-skin lattice structure comprising first-medial-skin segments intersecting at first-medial-skin nodes arranged at the first truss nodes and a plurality of first-medial-skin voids positioned between the first-medial-skin nodes and between the first-medial-skin segments;

a metal second microtruss panel comprising a second outer skin, a second medial skin opposite the second outer skin, and a second microtruss structure integral with the second outer skin and with the second medial skin, wherein the second microtruss structure is a three-dimensional, periodic open-cellular structure comprising second truss elements that intersect at second truss nodes, and wherein the second medial skin forms is a grid-shaped second-medial-skin lattice structure comprising second-medial-skin segments intersecting at second-medial-skin nodes arranged at the second truss nodes and a plurality of second-medial-skin voids positioned between the second-medial-skin nodes and between the second-medial-skin segments; and a damping film comprising acrylic tape or a synthetic rubber material positioned between and engaged with the first microtruss panel and the second microtruss panel opposite the first outer skin and the second outer skin, wherein the damping film is a grid-shaped damping-film lattice structure comprising damping-film segments intersecting at damping-film nodes arranged at the first-medial-skin nodes and the second-medial-skin nodes and a plurality of damping-film voids positioned between the damping-film nodes and between the damping-film segments;

wherein the damping-film lattice structure, the first-medial-skin lattice structure, and the second-medial-skin lattice structure are aligned such that the damping-film voids, the first-medial-skin voids, and the second-medial-skin voids are aligned and form a through-holes between the first microtruss panel and the second microtruss panel.

2. The sandwich panel of claim 1, wherein the first truss elements and the first outer skin define a plurality of first-microtruss-panel square pyramids.

3. The sandwich panel of claim 1, wherein the second truss elements and the second outer skin define a plurality of second-microtruss-panel square pyramids.

4. The sandwich panel of claim 1, wherein at least a subset of the first truss elements terminate at the first medial skin.

5. The sandwich panel of claim 1, wherein the damping film is equidistant from the first outer skin and the second outer skin.

6. The sandwich panel of claim 1, wherein the first outer skin and the first microtruss structure of the first microtruss panel are substantially identical with the second outer skin and the second microtruss structure of the second microtruss panel.

7. The sandwich panel of claim 6, wherein the damping film is adhered to the first microtruss panel and to the second microtruss panel.

8. The sandwich panel of claim 1, wherein the first outer skin comprises a plurality of first-outer-skin ridges extending toward the second microtruss panel.

9. The sandwich panel of claim 8, wherein a subset of the plurality of first-outer-skin ridges extends linearly between intersections of the first truss elements and the first outer skin.

10. A sandwich-panel assembly, comprising:
a sandwich panel, comprising:
- a metal first microtruss panel comprising a first outer skin, a first medial skin opposite the first outer skin, and a first microtruss structure integral with the first outer skin and with the first medial skin, wherein the first microtruss structure is a three-dimensional, periodic open-cellular structure comprising first truss elements that intersect at first truss nodes, and wherein the first medial skin is a grid-shaped first-medial-skin lattice structure comprising first-medial-skin segments intersecting at first-medial-skin nodes arranged at the first truss nodes and a plurality of first-medial-skin voids positioned between the first-medial-skin nodes and between the first-medial-skin segments;
- a metal second microtruss panel comprising a second outer skin, a second medial skin opposite the second outer skin, and a second microtruss structure integral with the second outer skin and with the second medial skin, wherein the second microtruss structure is a three-dimensional, periodic open-cellular structure comprising second truss elements that intersect at second truss nodes, and wherein the second medial skin is a grid-shaped second-medial-skin lattice structure comprising second-medial-skin segments intersecting at second-medial-skin nodes arranged at the second truss nodes and a plurality of second-medial-skin voids positioned between the second-medial-skin nodes and between the second-medial-skin segments; and
- a damping film comprising acrylic tape or a synthetic rubber material positioned between and engaged with the first microtruss panel and the second microtruss panel opposite the first outer skin and the second outer skin, wherein the damping film is a grid-shaped damping-film lattice structure comprising damping-film segments intersecting at damping-film nodes arranged at the first-medial-skin nodes and the second-medial-skin nodes and a plurality of damping-film voids positioned between the damping-film nodes and between the damping-film segments;

wherein the damping-film lattice structure, the first-medial-skin lattice structure, and the second-medial-skin lattice structure are aligned such that the damping-film voids, the first-medial-skin voids, and the second-medial-skin voids are aligned and form a through-hole between the first microtruss panel and the second microtruss panel; and equipment operatively coupled to the sandwich panel.

11. A method of manufacturing the sandwich panel of claim 1, comprising:
additively manufacturing the first microtruss panel;
additively manufacturing the second microtruss panel; and
coupling the damping film between the first microtruss panel and the second microtruss panel.

12. The sandwich panel of claim 1, further comprising a first-microtruss-panel mount configured to operatively couple equipment to the sandwich panel.

13. The sandwich panel of claim 12, wherein the first-microtruss-panel mount is integral with the first outer skin.

14. The sandwich panel of claim 12, wherein the first-microtruss-panel mount is operatively coupled to the first outer skin.

15. The sandwich panel of claim 12, wherein the first-microtruss-panel mount comprises a threaded mount.

16. The sandwich-panel assembly of claim 10, wherein at least a subset of the first truss elements terminate at the first medial skin.

17. The sandwich-panel assembly of claim 10, wherein the first outer skin and the first microtruss structure of the first microtruss panel are substantially identical with the second outer skin and the second microtruss structure of the second microtruss panel, and wherein the damping film is adhered to the first microtruss panel and to the second microtruss panel.

18. The sandwich-panel assembly of claim 10, further comprising a first-microtruss-panel mount configured to operatively couple the equipment to the sandwich panel, and wherein the first-microtruss-panel mount is operatively coupled to the first outer skin.

19. The sandwich-panel assembly of claim 10, further comprising a first-microtruss-panel mount configured to operatively couple the equipment to the sandwich panel, and wherein the first-microtruss-panel mount is integral with the first outer skin.

20. The sandwich-panel assembly of claim 10, wherein the damping film is equidistant from the first outer skin and the second outer skin.

* * * * *

UNITED STATES PATENT AND TRADEMARK OFFICE
CERTIFICATE OF CORRECTION

PATENT NO. : 12,172,415 B2  
APPLICATION NO. : 18/153916  
DATED : December 24, 2024  
INVENTOR(S) : Richard W. Aston et al.

Page 1 of 1

It is certified that error appears in the above-identified patent and that said Letters Patent is hereby corrected as shown below:

In the Claims

Column 12, Lines 16-18 of Claim 1, the text that reads, "and wherein the second medial skin forms is a grid-shaped second-medial-skin lattice structure," should read --and wherein the second medial skin is a grid-shaped second medial-skin lattice structure--

Column 12, Lines 38-39 of Claim 1, the text that reads, "and the second-medial-skin voids are aligned and form a through-holes" should read --and the second-medial-skin voids are aligned and form through-holes--

Signed and Sealed this  
Eighteenth Day of February, 2025

Coke Morgan Stewart  
*Acting Director of the United States Patent and Trademark Office*